June 23, 1931.　　　　　S. F. NEWMAN　　　　　1,811,802
COLLAPSIBLE TAP
Filed April 25, 1927　　　5 Sheets-Sheet 1

Inventor,
Samuel F. Newman,
By
Attorney

June 23, 1931.  S. F. NEWMAN  1,811,802
COLLAPSIBLE TAP
Filed April 25, 1927   5 Sheets-Sheet 2

Inventor
Samuel F. Newman,
By
Attorney

June 23, 1931.  S. F. NEWMAN  1,811,802
COLLAPSIBLE TAP
Filed April 25, 1927  5 Sheets-Sheet 3
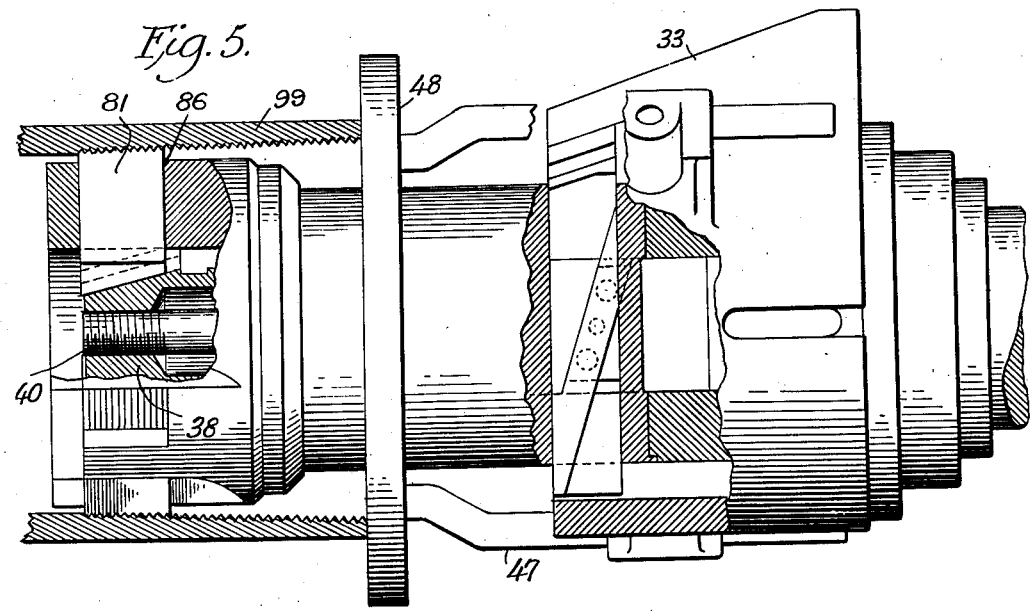
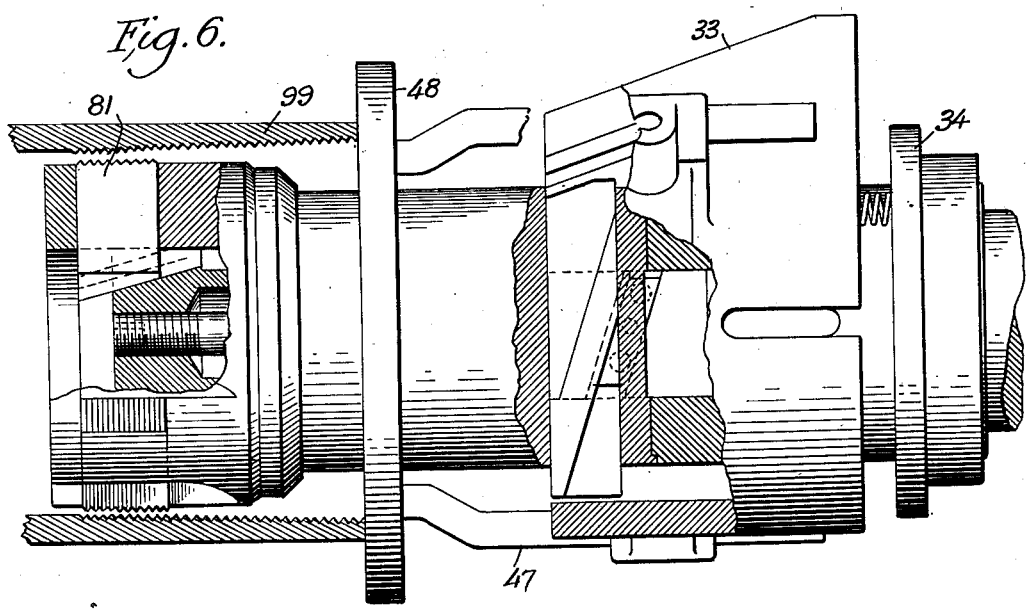
Inventor
Samuel F. Newman,
By
Attorney

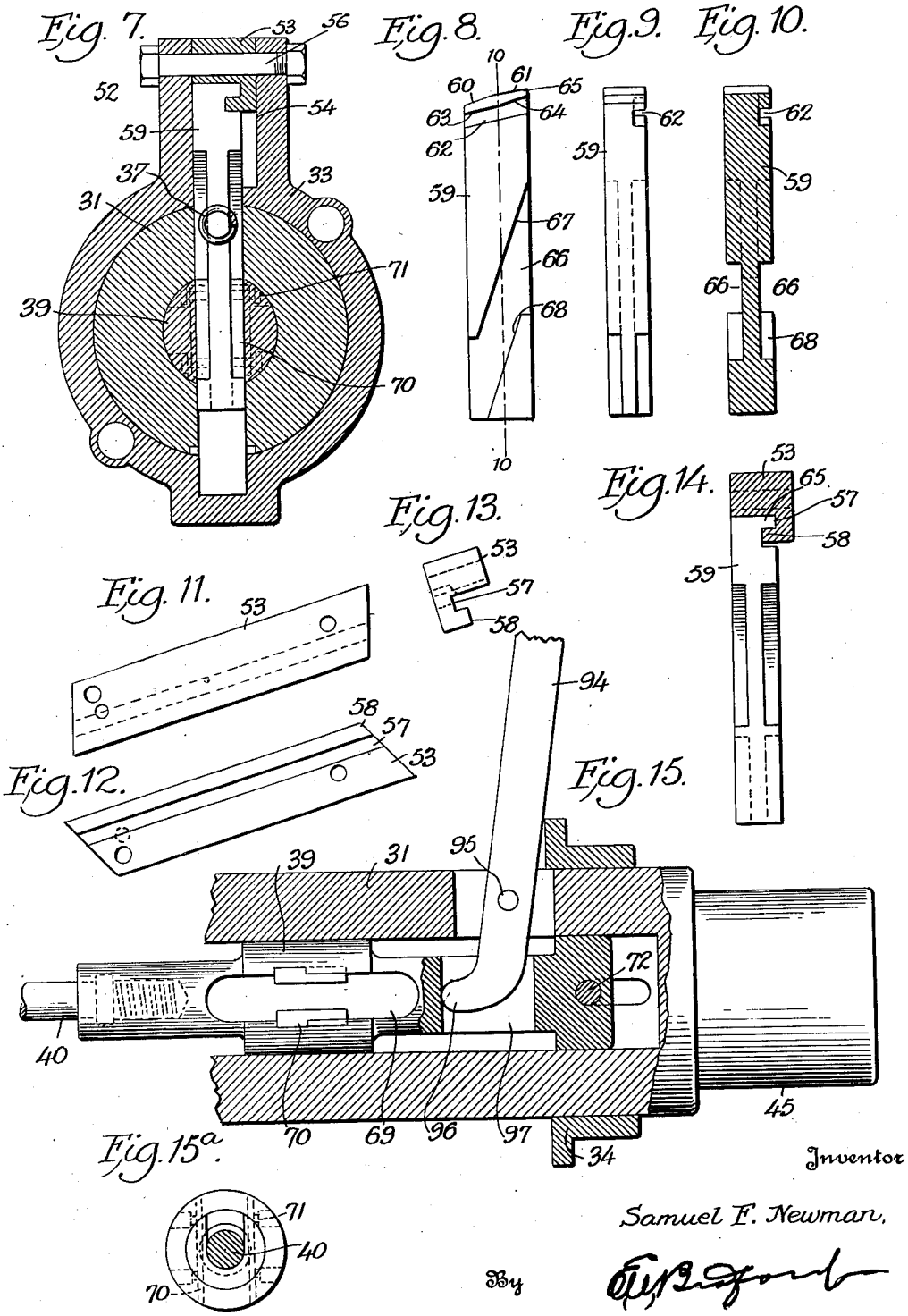

June 23, 1931.  S. F. NEWMAN  1,811,802
COLLAPSIBLE TAP
Filed April 25, 1927  5 Sheets-Sheet 5

Inventor
Samuel F. Newman,
By
Attorney

Patented June 23, 1931

1,811,802

UNITED STATES PATENT OFFICE

SAMUEL F. NEWMAN, OF WAYNESBORO, PENNSYLVANIA, ASSIGNOR TO LANDIS MACHINE COMPANY, OF WAYNESBORO, PENNSYLVANIA, A CORPORATION

COLLAPSIBLE TAP

Application filed April 25, 1927. Serial No. 186,470.

My invention relates to receding collapsible taps such as are used for producing taper threads in the bores of tubes, couplings, pipes, valve bodies or any internal threading of a nature requiring tapered threads.

An object of the invention is to provide improved thread producing cutters which recede during the process of cutting a thread with means for controlling the receding action, and improved means for collapsing the tap when a thread of the desired length has been cut.

Another object of this invention is to provide removable cutters or thread producing cutters without the introducing of new working or sliding surfaces such as are introduced in taps heretofore disclosed where the chaser has a slidable contact with one of the taper producing members.

It is also an object of the invention to provide a cutter whereby threads of two or more tapers may be cut with the same tap.

It is a further object of the invention to provide a collapsible tap having removable members so that a large range of diameters may be threaded without the necessity of duplicating the entire tap.

Further objects and advantages of the invention will become apparent as the description proceeds.

Figure 1:
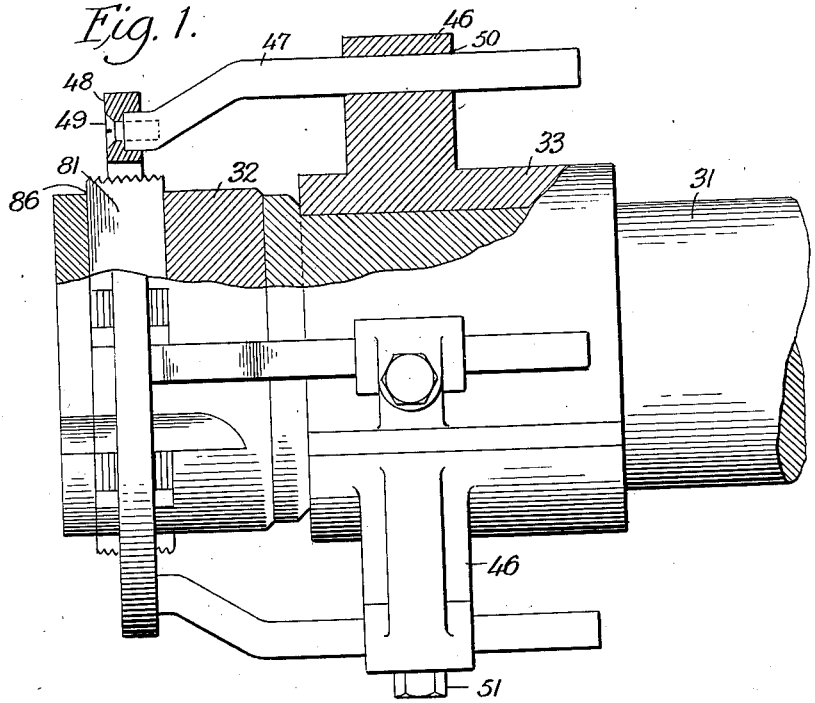
Figure 2:
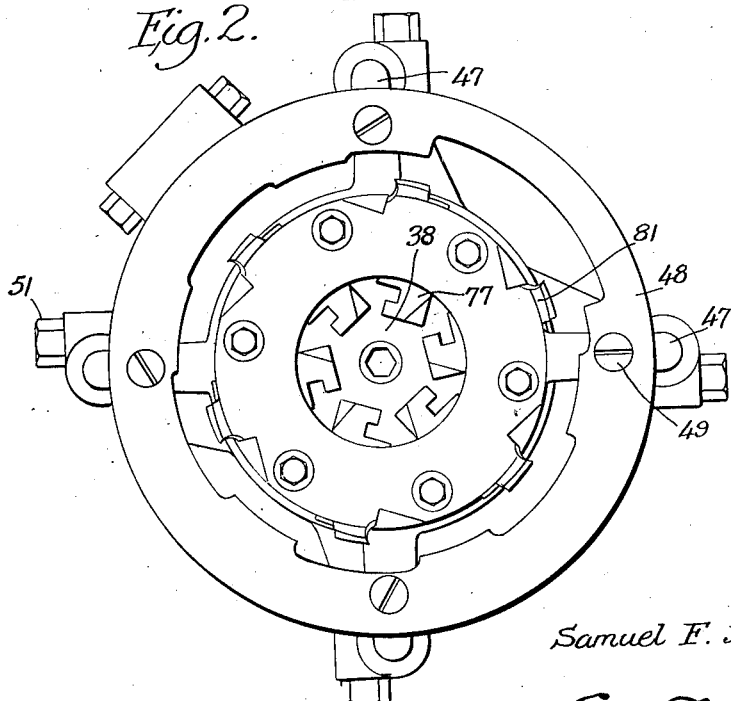
Figure 3:
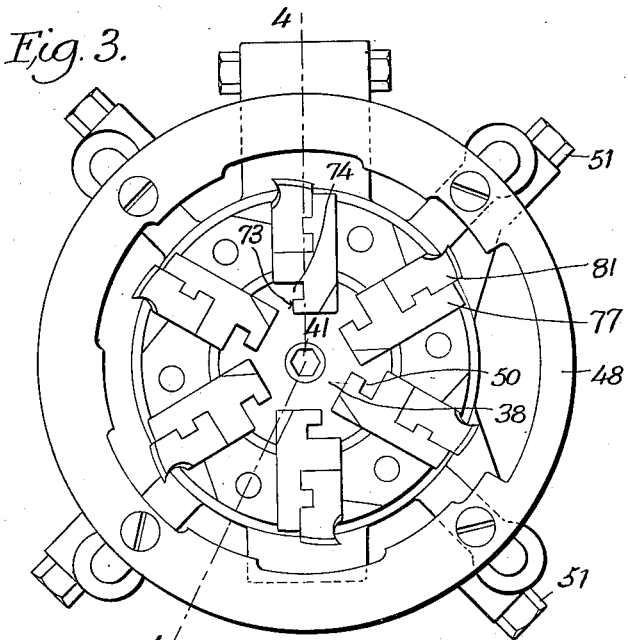
Figure 4:
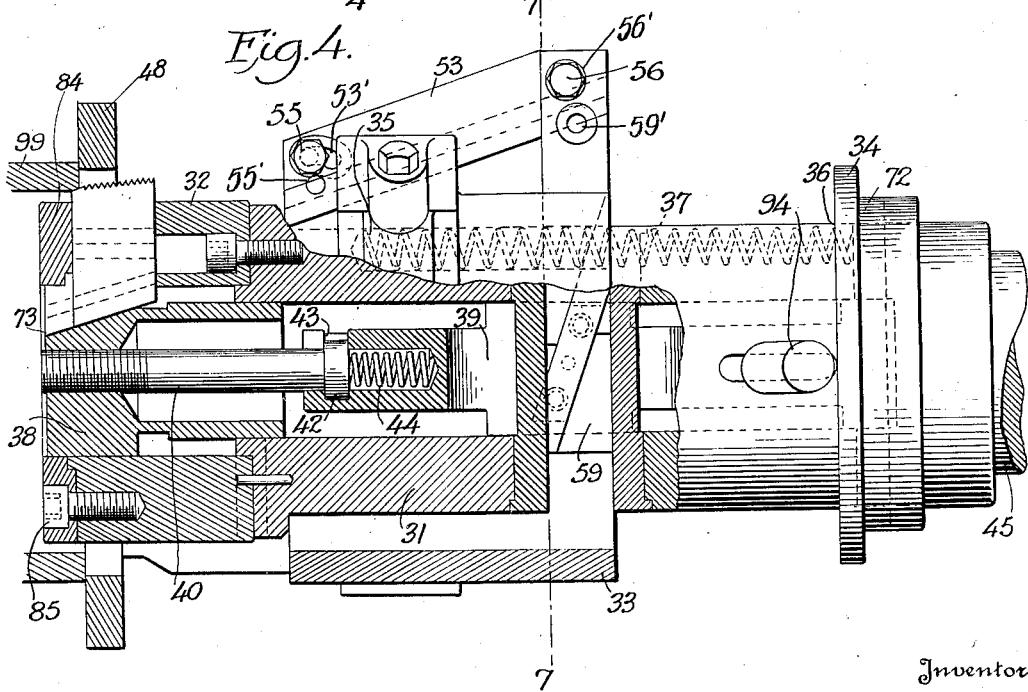
Figure 16:
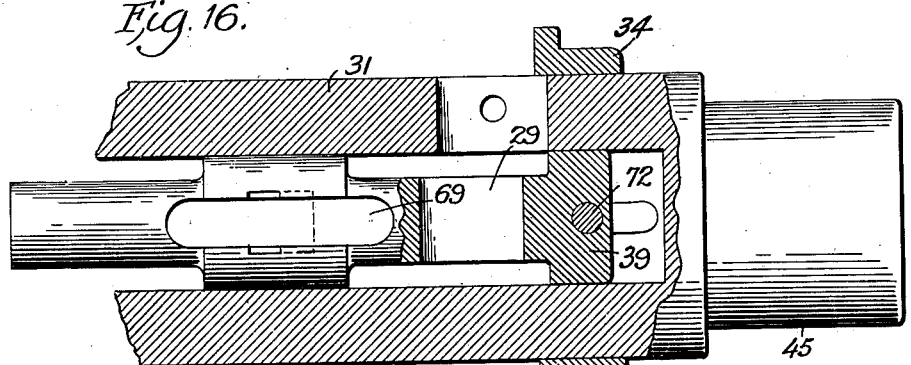
Figure 17:
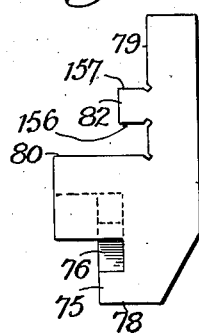
Figure 18:
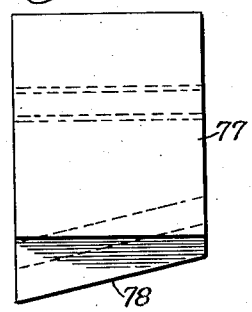
Figure 19:
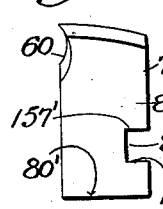
Figure 20:
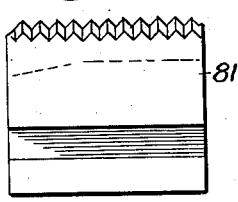
Figure 21:
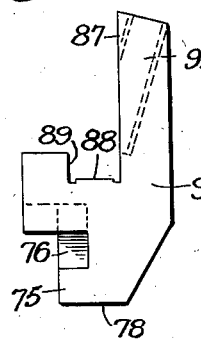
Figure 22:
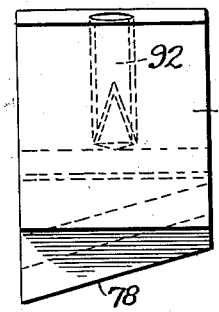

Referring to the accompanying drawings which are made a part hereof and on which similar reference characters indicate similar parts, Figure 1 is a view of my device with certain parts in section, Figure 2, a face view of the same, Figure 3, a face view of the same with the front plate or cap removed, the device being slightly turned, Figure 4, a partial section 4—4 of Figure 3, Figure 5, a view with sections cut away showing my device at collapsing point, Figure 6, a view with sections cut away after collapsing, Figure 7, a section 7—7 of Fig. 4, Figures 8, 9 and 10 are views of the controlling cam for receding and collapsing the threaded cutters, Figures 11, 12 and 13 are views of the controlling member which actuates the part shown in Figs. 8, 9 and 10, Figure 14, a view of the relation of the member shown in Figs. 8, 9 and 10 to the member shown in Figs. 11, 12 and 13 and corresponds to a section at 7—7 of Fig. 4, Figure 15, a sectional view showing manual means for resetting the thread cutters after they have been collapsed, Figure 15a, an end view of parts 6 and 18 as shown in Fig. 15, Figure 16, a sectional view of the tap modified for resetting by power means, Figures 17 and 18, views of the member on which the threading cutters are mounted, Figures 19 and 20, views of the threading cutter used in the member shown in Figs. 17 and 18, Figures 21 and 22, views of the member in which the threading cutters are mounted in a manner different from that shown in Figs. 17 and 18, and Figures 23 and 24, views of the thread cutter used in the member shown in Figs. 21 and 22.

In a patent to Koontz, No. 1,391,639, September 20, 1921, is shown a receding collapsing tap in which the receding action is controlled by one surface only with the result that receding is controlled in one direction only. In the device herein disclosed, the receding action is positively controlled in both directions by means of shoes which bear against both sides of a cam slot in a transverse member which controls or produces the receding action. In the patent above referred to, the receding action is effected by means of a spring, whereas in my invention herein disclosed the receding of the cutting elements is positive through the action of shoes operating against a transverse cam as will later be described.

In the drawings, reference character 31 indicates a body on which are mounted the cutter carrying head 32, the receding and controlling ring member 33 and a collar 34. Seated in suitable sockets 35 in the ring member 33 and sockets 36 in the collar 34 are compression springs 37 which tend to urge the ring member 33 and the collar member 34 in opposite directions. The object of this spring member will later become apparent.

Mounted internally of said body member 31 and cutter carrying head 32, is a longitudinal plunger 39, which will later be described.

A rod 40 is screw threaded into the head end 38 of the plunger and has on the outer end a square or hexagonal head 41 adapted to receive a wrench or the like for adjusting the head 38 relative to the plunger 39. The other end of the rod 40 is provided with an enlarged head 42 for insertion in a slot 43 and is held in frictional engagement with the side of the slot by means of a compression spring 44 as shown in Fig. 4.

Extending rearwardly of the body member 31 is a shank portion 45 adapted to be held in a machine used for various operations such as a lathe, a horizontal or vertical drill, a radial drill, a boring machine, a horizontal turret lathe, etc. The ring member 33 is slidably mounted upon the body 31 and has radially extending ears 46 having holes 50 therein for the reception of rods 47 upon the ends of which is mounted a ring member 48 by means of screws or bolts 49 counter-sunk in the face of said ring 48. The rods 47 are held in the holes 50 by means of bolts or screws 51. It will readily be seen that by loosening the bolts or screws 51 the ring 48 may be adjusted toward and from the ring member 33 and secured in the adjusted position.

The ring member 33 has also an extending cored flange 52 in which may be mounted a slide member 53. The member 53 is fastened at the front end to the flange 52 by bolts 55 and 55' and at the rear end by a bolt 56. As shown in Fig. 4, an arcuate slot 53' permits the member 53 to swing about the bolt 55'. Holes 56' and 59' in the rear part of the flange 52 allow the slide 53 to be fastened in either of two positions. The purpose of this adjustibility will later appear. The member 53 as shown in Figs. 11, 12, 13 and 14 has a longitudinal slot or groove 57 and a tongue 58 and is L-shaped in cross-section, as best shown in Figs. 13 and 14. Mounted in a radial recess of the body member 31 is a transverse slide 59 having on its outer end cam surfaces 60 and 61 and having a slot 62 adjacent the same end. The slot 62 has cam surfaces 63 and 64 cut to correspond with the cam surfaces 61 and 60 respectively; that is, the plane of the surface 63 is parallel to the plane of the surface 61 and the plane of the surface 64 is parallel to the plane of the surface 60. As shown in Fig. 14, the slide member 53 is adapted to ride upon the outer end of the member 59 and the slot and tongue of the member 53 are adapted to engage the tongue 65 and the groove 62 of the member 59. Due to the angular position of the member 53 it will be apparent that any longitudinal movement of the ring 33 will cause a movement of the member 59 radially of the body member 31; that is, the member 59 will be forced transversely with respect to the body member 31.

From an inspection of the member 59 as shown in Figures 8, 9 and 10, it will be seen that this member is provided on opposite faces thereof with cam slots 66 having cam surfaces 67 and 68. The longitudinal plunger 39, above mentioned, is provided on its inner end with an opening 69. Upon the inner sides of the slot 69 in the member 39, shoes 70 are securely fixed by means of screws 71 or the like. The transverse member 59 is positioned to slide transversely of the member 39 through the slot 69 and the shoes 70 are adapted to engage the cam slots or grooves 66 in the member 59. It will be seen, therefore, that any transverse movement of the member 59 will cause the member 39 to slide in the bore of the body 31.

The collar 34 previously mentioned, is fixed by means of screws or bolts 72 to the inner end of the plunger 39. The forward or outer end 38 of the plunger is provided with cam grooves 73 and a tongue 74 adapted to engage a tongue 75 and a groove 76 respectively of a cutter holding member 77.

From an inspection of Figs. 17 and 18, it will be seen that the cutter holding member 77 has a cam surface 78 at its innermost edge. This surface is adapted to be engaged by the corresponding end of the groove 73 of the end 38 of the plunger. The holder member 77 is cut out on a side adjacent the tongue 75 and the groove 76 to provide engaging surfaces 79 and 80 with corresponding surfaces 79' and 80' of the cutter member 81. The holder member 77 is provided with an elongated rib or tongue 82 having surfaces 156 and 157 for engaging an elongated groove 83 of the cutter member 81 as shown in Fig. 3. A front plate member 84 is removably attached to the head member 32 by means of bolts or screws 85. The head member 32 is provided with radial slots 86 through which the cutter members 81 and their holders 77 extend when in operative position.

Figure 23:
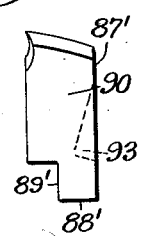
Figure 24:
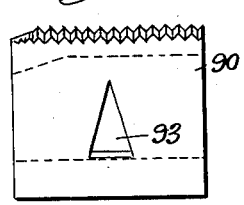

Figs. 21 and 22 show modified forms of the cutter holder and Figs. 23 and 24 are various showings of a cutter for use in the holder shown in Figs. 21 and 22. In this modified form the holder has a radial face 87, a seat 88 and a corresponding adjacent face 89 for receiving respectively the faces 87', 88' and 89' of the cutter or die 90. The holder 91 is provided with a screw threaded hole 92 and the cutter or die is provided with a cut-away portion 93 in its back into which a screw may be inserted to hold the cutter in place in its socket. In mounting and dismounting the holder and cutter shown in Figs. 17, 18, 19 and 20, it is necessary to remove the end plate 84 in order to replace the cutters or to change the cutters. With the holder and cutter shown in Figs. 21 to 24, it is not necessary to remove this end plate in order to substitute new cutters; all that is necessary is to remove the screw from the sockets 92 and 93, whereupon the cutter may be removed from the cutter holder.

A handle 94 pivoted at 95 in a recess in the body 31 has an end 96 in engagement with the side of a recess 97 in the member 39 and serves to force the collapsed tap back to operative position after collapsing. Instead of manually operable means 94, above described, the tap may be reset by mechanism upon the machine itself. Suitable mechanism may be placed upon the machine so as to engage the edge 97' of the flange 98 of the collar 34 to force this member toward the front or cutting end of the tap as shown in Fig. 16.

The method of operation is as follows:

The shank portion 45 of the tap is secured upon a complete machine used for a drill or boring machine etc. and the work 99 is secured in position upon the machine, whereupon rotation either of the tap or the work is begun. If desired, a suitable lead screw may be used to feed the tap into the work in a manner well known to those familiar with machines of this character. When starting a cutting operation, the ring member 48 is adjusted to engage the end of the work 99, whereupon the machine is started. As the tap is threaded into the work being cut, the ring 48 is forced back by means of the work 99 and through the medium of the rigid rods 47 forces ring member 33 toward the right, as shown in Figs. 1, 4 and 5. As the ring member 33 is forced to the right, as shown in Fig. 4, the member 53, rigidly secured therein, slides on the cam surface 60 and, since the member 53 is placed at an angle to the direction of its travel, it forces the member 59 inwardly. As this member 59 moves inwardly, it forces the member 39 to the rear, as shown in Figs. 4 and 15, due to the fact that the shoe members 70 are in engagement with the cam grooves 66. As the member 39 travels back it carries with it the head 38 through the medium of the rod 40 and the rearward movement of the head 38 due to the cam grooves 73 acting upon corresponding grooves and ridges in the cutter holders 77, withdraws the cutter holders 77, and thus cuts a taper thread in the work 99. When the slide member 59 has been forced inwardly to a point where the shoes 70 pass beyond the edges of the cam surfaces 68 of the slot 66, the member 39 is quickly withdrawn to the right, as shown in Fig. 6, to collapse the cutters. It should be observed that as the ring 33 travels back the spring member 37 is compressed against the collar or ring 34. As soon as the shoe 70 is released by the cam surface 68 the energy built up in the compression springs 37 forces the collar to the right to aid in quickly withdrawing the member 39 and its component parts to collapse the cutter holders.

In order to reset the tap to cut a second thread, the lever 94 is tightly gripped and forced in a direction to force the member 39 outwardly to reposition the slide groove 73 and thus force the cutter holders and the cutters into position to cut a new thread. As above mentioned, the lever 94 may be dispensed with and some member of the machine frame may be positioned to engage the flange surface 97 to urge the ring member 34 to the left and thus reset the tap.

Should it be desired to cut a taper of a different pitch, the bolt 55 is loosened and the bolt 56 removed from the hole 56'. The member 53 is then swung on the pivot 55' and bolted on the flange 52 through the holes 59'. This changes the angular position of the slide 53 with respect to the direction of its travel, and, therefore a given longitudinal movement of the member 53 will produce a smaller inward movement to the member 59, resulting in a slightly less retraction of the member 39. It will readily be seen that the effect of a changed position to the member 53 will affect the amount of retraction to the cutter members 81 and, therefore, result in a taper of a slightly different pitch. Obviously, the number of different tapers which may be cut by the adjustment of the member 53 is limited only to the practical mechanical problem of cutting tapers of a different pitch on the outer end of the member 59 combined with the practical problem of adjusting the member 53 to a number of different angular positions with respect to the direction of its travel.

In order to change the diameter of the thread desired to be cut, the rod 40 is rotated by means of a wrench inserted in socket 41 in the end of the cutter head. It will be appreciated that any rotation of the rod 40 will move the head 38 and the cam surface 73 with relation to the holder member 77 and, therefore, radially position the cutter member 81.

The length of the thread desired to be cut within the pipe may be regulated by positioning the member 48 with respect to the transverse slide members 59. When the member 48 is set so that slide 59 is positioned part of the way in, obviously the collapsing mechanism will come into operation within a shorter period of time and, therefore, result in a shorter thread within the work.

While I have preferred to show the ring member 48 engaging the work 99 to actuate the sliding ring 33, I do not propose to be limited to this method as any means that will maintain the position of the sliding member 33 relative to the cutting serrations will come within the scope of my invention.

It will be observed that the head 32 is detachably held to the body 31 by bolts or screws. The head may, therefore, be readily removed and a head of a different size attached with holders and cutters of a correspondingly different size. In this way a great range of diameters may be cut with the one device by substituting relatively few and simple elements.

It will be obvious to those skilled in the art that various changes may be made in my device without departing from the spirit of my invention, and I, therefore, do not limit myself to what is shown in the drawings and described in the specification, but only as set forth in the appended claims.

Having thus fully described my said invention, what I claim as new and desire to secure by Letters Patent, is:

1. A collapsible tap comprising a body, a member slidable axially of said body having a cam groove in the end thereof for engagement with a corresponding cam surface upon a cutter holder member and having a shoe member on the opposite end for engagement with a radially slidable member having cam grooves cut at an angle therein, a ring member mounted upon said body, a member having a cam surface secured to said ring member and adapted to engage a corresponding cam edge in the transverse member whereby movement of the ring member in one direction will force the said transverse member inwardly and force a retraction of the slidable member to produce a taper thread, substantially a set forth.

2. A collapsible tap comprising a body member, a cutter head detachably secured thereto, threading elements radially mounted in the cutter head, a position determining device mounted in the body member having inclined bearings for positioning the threading elements radially and a transverse slide for engaging the positioning device to retract the same, and means mounted on the body member and being movable with respect to the work for moving the transverse slide, substantially as set forth.

3. A collapsible tap comprising a body member, a head removably attached thereto, a longitudinally slidable member in the body member having inclined surfaces on the end adjacent the cutter elements, cutter holding members mounted on said inclined surfaces, cutter elements mounted in the holders, the said longitudinally slidable member having an opening through the inner end, a transverse cam mounted to slide radially of said body member and through the opening, and means for moving the radially slidable member to force retraction of the longitudinally slidable member to gradually retract the cutters to cut tapered threads on the work, substantially as set forth.

4. A collapsible tap comprising a body member, cutter members mounted therein and adapted to be positioned radially, a longitudinal slide for the cutters, a transverse slide adapted to engage shoes on the longitudinal member, a ring member mouned on the body member and slidable longitudinally thereon, a cam member mounted on the ring member and adapted to engage a cam surface on the transverse member, means movable in timed relation with the relative movement of the tap and the work for moving the transverse member to retract the cutters, and means for collapsing the cutter when the tap has moved a predetermined distance with relation to the work, substantially as set forth.

5. In a collapsible tap a body member a head secured thereon, said head having radial slots therein for receiving thread cutting elements, a plunger in said body member, said plunger having inclined surfaces against which the inner edge of said cutting elements seat, a radial slot through the plunger, shoes mounted on the inner side of the slot, a slide positioned through said slot and extending radially through the body member, the slide having sloping grooves on each side for receiving said shoes on the sides of the slot and means operated by engagement with the work for moving the slide radially, substantially as set forth.

6. A collapsible tap comprising a body member, a head secured thereon, said head having radial slots therein for receiving thread cutting elements, a plunger within the body member having tapered slots in the end for seating thread cutting elements, a bar slidable radially through the body member said bar having cam surfaces thereon for engaging with the corresponding cam surfaces on said plunger, means for moving the slide transversely of the plunger to retract the plunger to cause the thread cutting elements to recede to cut a tapered thread, substantially as set forth.

7. A collapsible tap comprising a body member, a head secured thereon, said head having radial slots therein for receiving thread cutting elements, a plunger within the body member having tapered slots in the end for seating thread cutting elements, a bar slidable radially through the body member said bar having cam surfaces thereon for engaging the corresponding cam surfaces on said plunger, means for moving the slide transversely of the plunger to retract the plunger to cause the thread cutting elements to recede, and means for collapsing the cutters when they have been retracted to a predetermined distance, substantially as set forth.

8. A collapsible tap comprising a body member, a head secured thereon, said head having radial slots therein for receiving thread cutting elements, a plunger within the body member having tapered slots in the end for seating thread cutting elements, a bar slidable radially through the body member, said bar having cam surfaces thereon for engaging the corresponding cam surfaces on said plunger, means for moving the slide transversely of the plunger to retract the plunger to cause the thread cutting elements to recede, and additional means for collapsing the cutters when they have been retracted to a predetermined distance, substantially as set forth.

9. A collapsible tap comprising a body member, a head secured thereon, said head having radial slots therein for receiving thread cutting elements, a plunger within the body member having tapered slots in the end for seating thread cutting elements, a bar slidable radially through the body member for engaging the corresponding cam surfaces on said plunger, means for moving the slide transversely of the plunger to retract the plunger to cause the thread cutting elements to recede, and a spring for collapsing the cutters when they have been retracted to a predetermined distance, substantially as set forth.

10. A collapsible tap comprising a body member, a head secured thereon, said head having radial slots therein for receiving thread cutting elements, a plunger within the body member having tapered slots in the end for seating thread cutting elements, a bar slidable radially through the body member for engaging the corresponding cam surfaces on said plunger, means for moving the slide transversely of the plunger to retract the plunger to cause the thread cutting elements to recede, a spring for collapsing the cutters when they have been retracted to a predetermined distance, and means for storing up energy in the spring during the retracting of the plunger to act in collapsing the cutters when the plunger has been retracted to a predetermined distance, substantially as set forth.

11. A collapsible tap comprising a body member, a head secured thereon, said head having radial slots therein for receiving thread cutting elements, a plunger axially slidable within the body member, said plunger having tapered slots in its forward end for seating thread cutting elements, a bar slidable radially through the body member, said bar having cam surfaces for contact with corresponding cam surfaces on said plunger, a ring for supporting the said bar, and means operated upon by the work for moving the said bar transversely of the plunger to retract the plunger to cause the cutting elements to recede to cut a tapered thread, substantially as set forth.

12. A collapsible tap comprising a body member, a head secured thereon said head having radial slots therein for receiving thread cutting elements, a plunger within the body member having tapered slots in its forward end for seating thread cutting elements, a transverse bar slidable through the body member, said bar having cam surfaces thereon for engaging corresponding cam surfaces on said plunger, a ring surrounding the body member, said transverse bar being carried by the said ring, and a slide operable by the work positioned obliquely with respect to the direction of its travel for moving the transverse bar radially of the body member, substantially as set forth.

13. A collapsible tap comprising a body member having a cutter head thereon, threading elements radially mounted in the cutter head, a position determining device mounted in the body member, said device having inclined bearings for positioning the threading elements radially and a transverse slide for engaging the positioning device to retract the same, and means mounted on the body member and being movable with respect to the work for moving the transverse slide, substantially as set forth.

14. A collapsible tap comprising a body member, cutter members mounted therein and adapted to be positioned radially, a longitudinal slide for the cutters, a transverse slide adapted to engage shoes on the longitudinal member, a ring member mounted on the body member and slidable longitudinally thereon, a cam member mounted on the ring member and adapted to engage a cam surface on the transverse member, means movable in timed relation with the relative movement of the tap and the work for moving the transverse member to retract the cutters, said cam member being adjustable on the ring member for varying the rate of movement of said transverse member, substantially as set forth.

15. A collapsible tap comprising a body member, a head secured thereon, said head having radial slots therein for receiving thread cutting elements, a plunger within the body member having tapered slots in the end for seating thread cutting elements, a bar slidable radially through the body member, said bar having a cam surface thereon for engaging with corresponding cam surfaces on the said plunger, means for moving the slide transversely of the plunger to retract the plunger to cause the thread cutting elements to move radially to cut a tapered thread, substantially as set forth.

In witness whereof, I have hereunto set my hand at Waynesboro, Pennsylvania, this thirteenth day of April, A. D. nineteen hundred and twenty-seven.

SAMUEL F. NEWMAN.